(12) United States Patent
Hong et al.

(10) Patent No.: US 11,006,467 B2
(45) Date of Patent: May 11, 2021

(54) METHOD AND APPARATUS FOR TRANSMITTING AND RECEIVING DATA USING WLAN RADIO RESOURCES

(71) Applicant: KT CORPORATION, Gyeonggi-do (KR)

(72) Inventors: Sung-pyo Hong, Seoul (KR); Woo-jin Choi, Seoul (KR)

(73) Assignee: KT CORPORATION, Gyeonggi-do (KR)

( * ) Notice: Subject to any disclaimer, the term of this patent is extended or adjusted under 35 U.S.C. 154(b) by 91 days.

(21) Appl. No.: 15/256,829

(22) Filed: Sep. 6, 2016

(65) Prior Publication Data

US 2017/0094700 A1    Mar. 30, 2017

(30) Foreign Application Priority Data

Sep. 24, 2015   (KR) .................. 10-2015-0135795
Jun. 13, 2016   (KR) .................. 10-2016-0073112

(51) Int. Cl.
*H04W 76/12*    (2018.01)
*H04L 29/06*    (2006.01)
(Continued)

(52) U.S. Cl.
CPC ......... *H04W 76/12* (2018.02); *H04L 63/0272* (2013.01); *H04L 63/08* (2013.01);
(Continued)

(58) Field of Classification Search
CPC ... H04W 76/022; H04W 76/12; H04W 12/06; H04W 48/18; H04W 72/042;
(Continued)

(56) References Cited

U.S. PATENT DOCUMENTS 8,942,099 B2 *  1/2015  Yeh ................. H04W 36/0038
                                                   370/235
10,638,531 B2 *  4/2020  Yi .................... H04W 72/1215
(Continued)

FOREIGN PATENT DOCUMENTS

KR    10-2014-0105357 A    9/2014

OTHER PUBLICATIONS

Qualcomm Incorporated et al., "WLAN Selection and Mobility", R2-152739, 3GPP TSG-RAN WG2 Meeting #90, Fukuoka, Japan, May 25-29, 2015, pp. 1-6.

(Continued)

*Primary Examiner* — Un C Cho
*Assistant Examiner* — Shah M Rahman
(74) *Attorney, Agent, or Firm* — IP Legal Services, LLC

(57) ABSTRACT

Provided is a method and apparatus for processing control plane data to enable an evolve Node B (eNB) and a User Equipment (UE) to transmit and/or receive user plane data through a WLAN carrier when the user plane data is transmitted by adding a WLAN radio resource to an E-UTRAN carrier in a radio access network (RAN) level. Particularly, provided is a method for a UE to transmit and receive data, the method including: receiving, from an eNB, wireless local area network (WLAN) cell configuration information which is for transmitting and receiving data using a WLAN radio resource; performing WLAN association based on the WLAN cell configuration information; transmitting a WLAN access confirmation message to the eNB; and receiving, from the eNB through a higher layer signaling, tunnel configuration information which is for the UE to set up a tunnel with the eNB through the WLAN radio resource.

12 Claims, 8 Drawing Sheets

(51) Int. Cl.
*H04W 48/18* (2009.01)
*H04W 12/06* (2021.01)
*H04W 84/12* (2009.01)
*H04W 72/04* (2009.01)

(52) U.S. Cl.
CPC ....... *H04W 12/0609* (2019.01); *H04W 48/18* (2013.01); *H04L 63/164* (2013.01); *H04W 72/042* (2013.01); *H04W 84/12* (2013.01)

(58) Field of Classification Search
CPC ..... H04W 84/12; H04W 76/11; H04W 76/15; H04L 63/08; H04L 63/0272; H04L 63/164
See application file for complete search history.

(56) References Cited

U.S. PATENT DOCUMENTS

| | | | | |
|---|---|---|---|---|
| 2014/0023041 | A1* | 1/2014 | Zhao | H04W 36/0011 370/331 |
| 2015/0020168 | A1* | 1/2015 | Faccin | H04W 12/06 726/4 |
| 2015/0133141 | A1* | 5/2015 | Song | H04W 72/0406 455/452.2 |
| 2015/0139184 | A1* | 5/2015 | Wang | H04W 28/08 370/331 |
| 2015/0208309 | A1* | 7/2015 | Taneja | H04W 36/0061 455/426.1 |
| 2015/0319662 | A1* | 11/2015 | Enomoto | H04W 36/14 370/338 |
| 2015/0319685 | A1* | 11/2015 | Zhao | H04W 40/02 370/329 |
| 2016/0128110 | A1* | 5/2016 | Sirotkin | H04W 76/022 370/329 |
| 2016/0174107 | A1* | 6/2016 | Kanugovi | H04L 12/28 370/236 |
| 2016/0234752 | A1* | 8/2016 | Hsu | H04L 12/4641 |
| 2016/0302110 | A1* | 10/2016 | Baboescu | H04L 12/4633 |
| 2016/0345334 | A1* | 11/2016 | Veerepalli | H04W 48/08 |
| 2016/0353506 | A1* | 12/2016 | HomChaudhuri | H04W 76/15 |
| 2017/0171782 | A1* | 6/2017 | Mohamed | H04W 36/0022 |
| 2017/0195930 | A1* | 7/2017 | Tomici | H04W 8/06 |
| 2017/0223578 | A1* | 8/2017 | Hong | H04L 1/00 |
| 2017/0231020 | A1* | 8/2017 | Tomici | H04L 63/0892 |
| 2017/0273125 | A1* | 9/2017 | Teyeb | H04W 76/15 |
| 2018/0014226 | A1* | 1/2018 | Li | H04L 47/41 |
| 2018/0092147 | A1* | 3/2018 | Pelletier | H04W 12/04 |
| 2018/0184297 | A1* | 6/2018 | Mohamed | H04W 36/0038 |
| 2018/0191493 | A1* | 7/2018 | Huang | H04L 63/164 |
| 2018/0199394 | A1* | 7/2018 | Teyeb | H04W 76/16 |
| 2019/0052603 | A1* | 2/2019 | Wu | H04L 65/1069 |
| 2019/0124511 | A1* | 4/2019 | Sirotkin | H04W 12/001 |

OTHER PUBLICATIONS

Alcatel-Lucent et al., "Further considerations on the user plane architecture for LTE-WiFi aggregation", R2-152616, 3GPP TSG-RAN WG2 Meeting #90, Fukuoka, Japan, May 25-29, 2015, pp. 1-3.
CATT, "Further Discussion on UP Architecture of LTE/WLAN Aggregation", R2-152100, 3GPP TSG RAN WG2 Meeting #90, Fukuoka, Japan, May 25-29, 2015, pp. 1-6.

* cited by examiner

METHOD AND APPARATUS FOR TRANSMITTING AND RECEIVING DATA USING WLAN RADIO RESOURCES

CROSS REFERENCE TO RELATED APPLICATION

This application claims priority from Korean Patent Application Nos. 10-2015-0135795 & 10-2016-0073112, filed on Sep. 24, 2015 & Jun. 13, 2016, which are hereby incorporated by reference for all purposes as if fully set forth herein.

BACKGROUND OF THE INVENTION

1. Field of the Invention

The present disclosure relates to a method and apparatus for processing control plane data to enable an evolve Node B (eNB) and a User Equipment (UE) to transmit and/or receive user plane data through a WLAN carrier when the user plane data is transmitted by adding a WLAN radio resource to an E-UTRAN carrier in a radio access network (RAN) level.

2. Description of the Prior Art

As communication systems have developed, various wireless terminals have been introduced to consumers, such as companies and individuals. A current mobile communication system has been affiliated with third generation partnership project (3GPP), such as long term evolution (LTE), LTE-Advanced (LTE-A), and the like. Such communication system may be a high-speed and high-capacity communication system capable of transmitting and receiving various types of data, such as image data, wireless data, and the like, beyond providing a voice-based service. Accordingly, there has been a desire for developing technology that enables transmitting high-capacity data as fast as a wired communication network. In order to transmit high capacity data, a scheme using a plurality of cells for effectively transmitting data has been introduced, lately.

However, such a scheme has a drawback. For example, a base station has a limitation in providing a large capacity of data to a plurality of UEs using a limited amount of frequency resources. That is, when a predetermined business operator secures an exclusively usable frequency resource, a high cost is required.

A business operator or a predetermined communication system is incapable of exclusively using non-licensed frequency band. Such a non-licensed frequency band may be shared by a plurality of operators or communication systems. For example, a wireless local area network (WLAN) technology, which is represented by WiFi, provides a data transmission and reception service using a frequency resource in the non-licensed band.

Therefore, there is demand for developing a technology for enabling a mobile communication system to transmit and receive data to/from a terminal using a WLAN access point (AP) or the like. Particularly, there has been no detailed procedure or method introduced for enabling a base station to use both of a WLAN carrier and a base station carrier for transmitting and receiving data to/from a terminal. Also, there is need for developing a data transmission technology and detailed procedures for reusing existing WLAN nodes in providing a technology of aggregating LTE and WLAN.

SUMMARY OF THE INVENTION

In this background, an aspect of the present disclosure is to provide a method for enabling a User Equipment (UE) and an evolved Node B (eNB) to transmit and receive data through the aggregation or integration of a WLAN radio resource and an eNB carrier.

Also, an aspect of the present disclosure is to provide a method for overcoming a delay problem caused by WLAN access authentication and tunnel setup, and a data transmission interruption problem that may occur since the WLAN coverage is small.

In accordance with an aspect of the present disclosure, there is provided a method for a User Equipment (UE) to transmit and receive data, the method including: receiving, from an evolved Node B (eNB), wireless local area network (WLAN) cell configuration information, which is for transmitting and receiving data using a WLAN radio resource; performing WLAN association based on the WLAN cell configuration information; transmitting a WLAN access confirmation message to the eNB; and receiving, from the eNB through a higher layer signaling, tunnel configuration information which is for the UE to set up a tunnel with the eNB through the WLAN radio resource.

In accordance with an aspect of the present disclosure, there is provided a method for an eNB to transmit and receive data, the method including: transmitting, to a UE, WLAN cell configuration information which is for transmitting and receiving data using a WLAN radio resource; receiving a WLAN access confirmation message from the UE; and transmitting, to the UE through a higher layer signaling, tunnel configuration information which is for the eNB and the UE set up a tunnel through the WLAN radio resource.

In accordance with an aspect of the present disclosure, there is provided a UE that transmits and receives data, the UE including: a receiving unit configured to receive, from an eNB, WLAN cell configuration information which is for transmitting and receiving data using a WLAN radio resource; a controller configured to perform WLAN association based on the WLAN cell configuration information; and a transmitting unit configured to transmit a WLAN access confirmation message to the eNB, wherein the receiving unit further receives tunnel configuration information which is for the UE and the eNB to set up a tunnel through the WLAN radio resource, from the eNB through a higher layer signaling, after transmitting the WLAN access confirmation message.

In accordance with an aspect of the present disclosure, there is provided an eNB that transmits and receives data, the eNB including: a transmitting unit configured to transmit, to a UE, WLAN cell configuration information which is for transmitting and receiving data using a WLAN radio resource; and a receiving unit configured to receive a WLAN access confirmation message from the UE, wherein the transmitting unit further transmits tunnel configuration information which is for the eNB and the UE to set up a tunnel through the WLAN radio resource, to the UE through a higher layer signaling, after receiving the WLAN access confirmation message.

According to the above described present embodiments, an eNB and a UE transmit and receive data through the aggregation or integration of a WLAN radio resource and an eNB carrier, and thus, the data processing speed and capacity may be increased.

Also, according to the present embodiments, a delay problem caused by WLAN access authentication and tunnel setup, and a data transmission interruption problem caused by the small WLAN coverage, may be overcome.

BRIEF DESCRIPTION OF THE DRAWINGS

The above and other objects, features, and advantages of the present invention will be more apparent from the fol

DETAILED DESCRIPTION OF THE EXEMPLARY EMBODIMENTS

Figure 1:
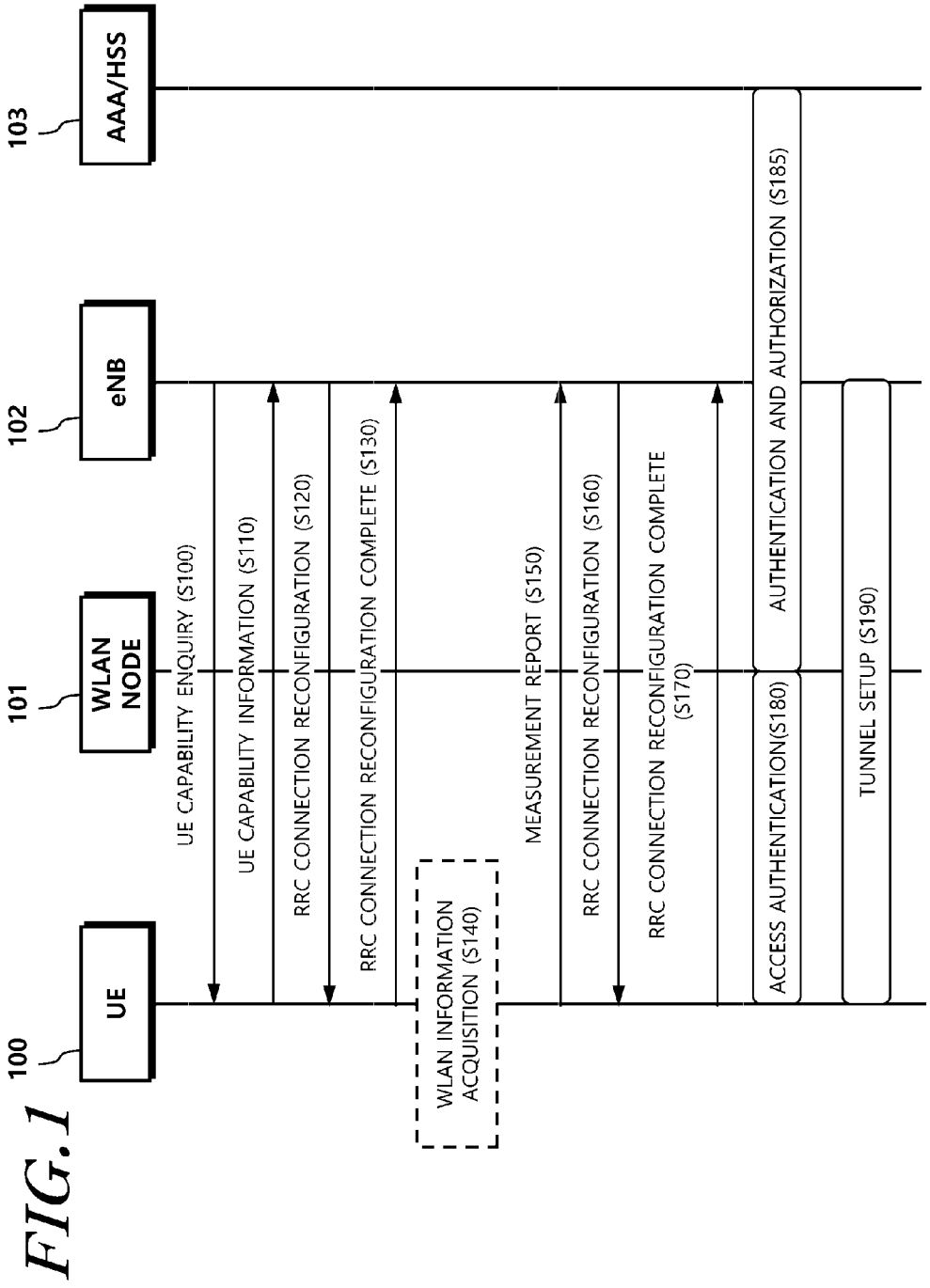
- FIG. 1 is a diagram illustrating a tunneling-based WLAN radio resource adding procedure according to an embodiment.

Hereinafter, embodiments of the present disclosure will be described in detail with reference to the accompanying drawings. In adding reference numerals to elements in each drawing, the same elements will be designated by the same reference numerals, if possible, although they are shown in different drawings. Further, in the following description of the present disclosure, a detailed description of known functions and configurations incorporated herein will be omitted when it is determined that the description may make the subject matter of the present disclosure rather unclear.

In the present specifications, a machine type communication (MTC) terminal refers to a low cost or low complex terminal that supports coverage enhancement, or the like.

In other words, in the present specifications, the MTC terminal may refer to a newly defined 3GPP Release 13 low cost (or low complexity) UE category/type, which executes LTE-based MTC related operations. Alternatively, in the present specifications, the MTC terminal may refer to a UE category/type that is defined in or before 3GPP Release-12 that supports the enhanced coverage in comparison with the existing LTE coverage, or supports low power consumption, or may refer to a newly defined Release-13 low cost (or low complexity) UE category/type.

The wireless communication system may be widely installed so as to provide various communication services, such as a voice service, packet data, and the like. The wireless communication system may include a User Equipment (UE) and a Base Station (BS or an eNB). Throughout the specifications, the user equipment may be an inclusive concept indicating a user terminal utilized in wireless communication, including a UE (User Equipment) in wideband code division multiple access (WCDMA), long term evolution (LTE), high speed packet access (HSPA), and the like, and an MS (Mobile station), a UT (User Terminal), an SS (Subscriber Station), a wireless device, and the like in global systems for mobile communication (GSM).

A base station or a cell may generally refer to a station where communication with a User Equipment (UE) is performed, and may also be referred to as a Node-B, an evolved Node-B (eNB), a Sector, a Site, a Base Transceiver System (BTS), an Access Point, a Relay Node, a Remote Radio Head (RRH), a Radio Unit (RU), and the like.

That is, a base station or a cell may be construed as an inclusive concept indicating a portion of an area covered by a BSC (Base Station Controller) in CDMA, a NodeB in WCDMA, an eNB or a sector (site) in LTE, and the like, and the concept may include various coverage areas, such as a megacell, a macrocell, a microcell, a picocell, a femtocell, a communication range of a relay node, and the like.

Each of the above mentioned various cells has a base station that controls a corresponding cell. Thus, the base station may be construed in two ways: i) the base station may be a device itself that provides a megacell, a macrocell, a microcell, a picocell, a femtocell, and a small cell in association with a wireless area; or ii) the base station may indicate a wireless area itself. In i), all devices that interact with one another so as to enable the devices that provide a predetermined wireless area to be controlled by an identical entity or to cooperatively configure the wireless area, may be indicated as a base station. Based on a configuration type of a wireless area, an eNB, a radio remote head (RRH), an antenna, an radio unit (RU), a Low Power Node (LPN), a point, a transmission/reception point, a transmission point, a reception point, and the like may be embodiments of a base station. In ii), a wireless area itself that receives or transmits a signal from a perspective of a terminal or a neighboring base station, may be indicated as a base station.

Therefore, a megacell, a macrocell, a microcell, a picocell, a femtocell, a small cell, an RRH, an antenna, an RU, an LPN, a point, an eNB, a transmission/reception point, a transmission point, and a reception point are commonly referred to as a base station.

In the specifications, the user equipment and the base station are used as two inclusive transceiving subjects to embody the technology and technical concepts described in the specifications, and may not be limited to a predetermined term or word. In the specification, the user equipment and the base station are used as two (uplink or downlink) inclusive transceiving subjects to embody the technology and technical concepts described in the specifications, and may not be limited to a predetermined term or word. Here, Uplink (UL) refers to a scheme for a UE to transmit and receive data to/from a base station, and Downlink (DL) refers to a scheme for a base station to transmit and receive data to/from a UE.

Varied multiple access schemes may be unrestrictedly applied to the wireless communication system. Various multiple access schemes, such as CDMA (Code Division Multiple Access), TDMA (Time Division Multiple Access), FDMA (Frequency Division Multiple Access), OFDMA (Orthogonal Frequency Division Multiple Access), OFDM-FDMA, OFDM-TDMA, OFDM-CDMA, and the like may be used. An embodiment of the present disclosure may be applicable to resource allocation in an asynchronous wireless communication scheme that is advanced through GSM, WCDMA, and HSPA, to be LTE and LTE-advanced, and may be applicable to resource allocation in a synchronous wireless communication scheme that is advanced through CDMA and CDMA-2000, to be UMB. The present disclosure may not be limited to a specific wireless communication field, and may include all technical fields in which the technical idea of the present invention is applicable.

Uplink transmission and downlink transmission may be performed based on a TDD (Time Division Duplex) scheme that performs transmission based on different times, or based on an FDD (Frequency Division Duplex) scheme that performs transmission based on different frequencies.

Further, in a system such as LTE and LTE-A, a standard may be developed by configuring an uplink and a downlink based on a single carrier or a pair of carriers. The uplink and the downlink may transmit control information through a control channel, such as a PDCCH (Physical Downlink Control CHannel), a PCFICH (Physical Control Format Indicator CHannel), a PITCH (Physical Hybrid ARQ Indicator CHannel), a PUCCH (Physical Uplink Control CHannel), an EPDCCH (Enhanced Physical Downlink Control CHannel), and the like, and may be configured as a data channel, such as a PDSCH (Physical Downlink Shared CHannel), a PUSCH (Physical Uplink Shared CHannel), and the like, so as to transmit data.

Control information may be transmitted using an EPDCCH (enhanced PDCCH or extended PDCCH).

In the present specification, a cell may refer to the coverage of a signal transmitted from a transmission/reception point, a component carrier having the coverage of the signal transmitted from the transmission/reception point (transmission point or transmission/reception point), or the transmission/reception point itself.

A wireless communication system, according to embodiments, refers to a Coordinated Multi-point transmission/reception (CoMP) system where two or more transmission/reception points cooperatively transmit a signal, a coordinated multi-antenna transmission system, or a coordinated multi-cell communication system. A CoMP system may include at least two multi-transmission/reception points and terminals.

A multi-transmission/reception point may be a base station or a macro cell (hereinafter, referred to as an 'eNB') and at least one RRH that is connected to the eNB through an optical cable or an optical fiber and is wiredly controlled, and has a high transmission power or a low transmission power within a macro cell area.

Hereinafter, a downlink refers to communication or a communication path from a multi-transmission/reception point to a terminal, and an uplink refers to communication or a communication path from a terminal to a multi-transmission/reception point. In a downlink, a transmitter may be a part of a multiple transmission/reception point and a receiver may be a part of a terminal. In an uplink, a transmitter may be a part of a terminal and a receiver may be a part of a multiple transmission/reception point.

Hereinafter, the situation in which a signal is transmitted and received through a PUCCH, a PUSCH, a PDCCH, an EPDCCH, a PDSCH, or the like may be described through the expression, "a PUCCH, a PUSCH, a PDCCH, an EPDCCH, or a PDSCH is transmitted or received".

In addition, hereinafter, the expression "a PDCCH is transmitted or received, or a signal is transmitted or received through a PDCCH" includes "an EPDCCH is transmitted or received, or a signal is transmitted or received through an EPDCCH".

That is, a physical downlink control channel used herein may indicate a PDCCH or an EPDCCH, and may indicate a meaning including both a PDCCH and an EPDCCH.

In addition, for ease of description, an EPDCCH, which corresponds to an embodiment of the present invention, may be applied to the part described using a PDCCH and to the part described using an EPDCCH.

Meanwhile, higher layer signaling includes an RRC signaling that transmits RRC information including an RRC parameter.

An eNB executes downlink transmission to terminals. The eNB 110 may transmit a Physical Downlink Shared Channel (PDSCH) which is a primary physical channel for unicast transmission, and may transmit a Physical Downlink Control Channel (PDCCH) for transmitting downlink control information, such as scheduling required for reception of a PDSCH, and scheduling grant information for transmission of an uplink data channel (for example, a Physical Uplink Shared Channel (PUSCH)). Hereinafter, transmission and reception of a signal through each channel will be described as transmission and reception of a corresponding channel.

A WLAN carrier in the present specification indicates a radio resource that uses WLAN, and may be expressed as various terms as occasion warrants, such as a WLAN radio link, WLAN radio, a WALN radio resource, a WLAN radio network, or the like. Hereinafter, for ease of understanding, descriptions will be provided by expressing a WLAN radio link, WLAN radio, a WLAN carrier, a WLAN radio network, or the like as a WLAN radio resource.

Also, in the present specification, a WLAN termination indicates a logical WLAN network node. For example, the WLAN termination may be a WLAN AP or a WLAN AC. The WLAN termination may be a WLAN network node, such as a legacy WLAN AP or a legacy WLAN AC, or may be a WLAN network node that includes an additional function for a WLAN aggregation transmission, when compared to a legacy WLAN AP or a legacy WLAN AC. The WLAN termination may be embodied as an independent entity or may be embodied as a functional entity that is included in another entity. Hereinafter, in the present specification, descriptions will be provided by expressing a WLAN network node as a WLAN termination or a WLAN AP, as occasion warrants. Also, in the present specification, descriptions will be provided by expressing a radio resource provided by an eNB as an eNB radio resource, an eNB carrier, or an E-UTRAN carrier.

A tunnel entity in the present specification indicates an entity for processing data transmitted and received through an internet protocol security (IPsec) tunnel, and the term is not limited thereto. For example, the tunnel entity may include various terms, such as an IPsec tunnel entity, a user data transmission/reception entity through an IPsec, a radio bearer-based entity that is configured in a higher level than an IPsec, an EPS bearer entity, an adaptation entity, an adaptation entity that is configured in a higher layer than a tunnel, a LTE/WLAN radio level integration Using IPsec Tunnel Encapsulation Protocol (LWIPEP) entity, an IPsec tunnel entity through WLAN, and the like. Hereinafter, for ease of understanding, descriptions will be provided by expressing them as a tunnel entity, it should be construed that the tunnel entity includes all of the entities having the same function, and the tunnel entity may be understood from the perspective of a function.

Also, in the present specification, a tunnel or an IPsec tunnel indicates a tunnel that is configured between a UE and an eNB for transmitting and receiving data through a WLAN radio resource. The tunnel or the IPsec tunnel may be referred to as various terms. For example, the IPsec tunnel may be designated as various terms, such as a GRE tunnel, a GTP tunnel, an encapsulation-based tunnel, or the like, and may not be limited to the above mentioned terms.

A WLAN interworking technology provides a RAN assisted WLAN interworking function. E-UTRAN may assist UEs in RRC IDLE state and RRC CONNECTED state to perform a UE-based bi-directional traffic steering between E-UTRAN and WALN.

E-UTRAN provides a UE with an assistant parameter through a broadcast signaling or an exclusive RRC signaling. RAN assistant parameters may include at least one out of: an E-UTRAN signal intensity threshold, a WLAN channel usage threshold, a WLAN backhaul data transmission rate threshold, a WLAN signal intensity (or a WLAN signal intensity threshold; for example, a BeaconRSSI threshold), and an offload preference indicator. Also, E-UTRAN may provide a UE with a list of WLAN identifiers through a broadcast signaling.

A UE may use the RAN assistant parameters to evaluate the access network selection and traffic steering rules defined in the TS 36.304 document or access network discovery and selection function (ANDSF) policies defined in the TS 24.312 document, so as to determine traffic steering between E-UTRAN and WLAN specified in the 3GPP TS 23.402 Architecture enhancements for non-3GPP accesses document.

When the access network selection and traffic steering rules defined in the TS 36.304 document are fulfilled, the UE may indicate the same forward to a higher layer of the access stratum.

When the UE applies the access network selection and traffic steering rules, the UE may perform traffic control between E-UTRAN and WLAN based on an APN granularity unit. As described above, the RAN assisted WLAN interworking function only provides a method in which E-UTRAN and WLAN are established in a standalone manner and work together.

From the above described limitations that the interworking technology using the standalone E-UTRAN and WLAN has, there is a desire for an LTE-WALN aggregation technology in which an eNB uses E-UTRAN and WLAN radio resources in the PDCP level. However, to use the LTE-WLAN aggregation technology in the PDCP level, a legacy WLAN AP needs to be upgraded. For example, to generate a tunnel between an eNB and a WLAN node, and to perform flow control, a legacy AP needs to be upgraded. To solve the above described problems, the present embodiment proposes an IPsec tunnel-based LTE-WLAN aggregation technology that is capable of reusing a legacy AP. Particularly, to perform the IPsec tunnel-based LTE-WLAN aggregation, a detailed control procedure performed between a UE and an eNB and a user plane data transmission method are required. Particularly, unlike an eNB cell, in WLAN, a great amount of time delay may occur due to access authentication and tunnel setup. For example, a time delay of approximately 3 to 5 seconds may exist to perform authentication using EAP-AKA. The WLAN cell has a smaller coverage than an eNB cell. Therefore, as a UE moves, a service may be interrupted or a data loss may occur, which is a drawback.

As described above, the typical LTE-WLAN aggregation/integration method requires upgrading the legacy AP, to provide the aggregation technology in the PDCP level. Even the IPsec tunnel-based LTE-WLAN aggregation/integration method, which is proposed to solve the above drawback, does not propose a detailed control procedure performed between a UE and an eNB, and a user plane data transmission method. Particularly, a time delay caused by performing WLAN access authentication and tunnel setup may be added, and there is high a probability that data transmission is interrupted due to the small coverage of the WLAN cell, which is drawback.

The present embodiment that is derived to overcome the above described drawbacks is to provide a control procedure and a data transmission method for providing a tunnel-based LTE-WLAN that is capable of reusing a legacy WLAN AP.

An RRC-connected UE may add a WLAN radio resource under the control of an eNB. When the eNB desires to add a WLAN radio resource without additional upgrading of a legacy WLAN AP, the eNB generates a tunnel between a UE and the eNB with respect to the RRC-connected UE through WLAN, and uses a WLAN radio resource. For example, an IPsec tunnel may be configured between the UE and the eNB, and may be configured through a WLAN radio resource. As another example, an IPsec tunnel may be configured between gateways that are connected to the UE and the eNB, and may be configured through a WLAN radio resource. To this end, data may be transmitted between the UE and the eNB through WLAN, based on the IPsec tunnel in a PDCP protocol layer or a higher layer thereof. For example, data may be transmitted between the UE and the eNB through WLAN based on the IPsec tunnel in a layer lower than the PDCP protocol layer (that is, PDCP PDU). As another example, data may be transmitted between the UE and the eNB through WLAN, based on the IPsec tunnel in a layer higher than the PDCP protocol layer (that is, PDCP SDU or IP packet).

Hereinafter, although descriptions are provided by assuming that an IPsec tunnel is configured in a layer higher than the PDCP protocol layer, and data is transmitted between an eNB and a UE through a WLAN radio resource, transmitting data based on an IPsec tunnel in a layer lower than the PDCP protocol layer is also included in the present disclosure.

FIG. 1 is a diagram illustrating a tunneling-based WLAN radio resource adding procedure according to an embodiment.

Referring to FIG. 1, an eNB 102 may request a UE radio access capability transmission for LTE-WLAN aggregation using a WLAN radio resource in operation S100. For example, to determine whether a corresponding UE 100 supports the LTE-WLAN aggregation technology or to determine WLAN band information that the UE 100 supports, the eNB 102 may request the UE radio access capability transmission.

The UE 100 may report a LTE-WLAN aggregation (LWA) capability including WLAN band information that the UE 100 supports in operation S110. The UE 100 may have a separate capability bit to indicate that the UE 102 supports LTE-WLAN interworking and an aggregation function. In addition, the UE 100 may have a separate capability bit to indicate that the UE 100 supports an aggregation technology that supports a radio bearer (e.g., a split bearer) through PDCP in the LTE-WLAN aggregation technology, and to indicate that the UE 100 supports a radio bearer (e.g., a tunnel bearer) through a tunnel. For example, the UE 100 reports an LWA capability that supports a tunnel bearer. Hereinafter, although descriptions are provided by assuming, as a tunnel bearer, a bearer that transmits and receives data by configuring an IPsec tunnel through a WLAN radio resource in the LTE-WLAN aggregation technology, the bearer is not limited to the term. That is, the tunnel bearer may be referred to as a switch bearer or the like, and they may be used to indicate the same meaning.

The eNB 102 may configure WLAN measurement with respect to the UE 100. For example, the eNB 102 includes, in an RRC connection reconfiguration message, measurement configuration information that is required when the UE 100 measures a WLAN radio resource, and transmits the same to the UE 100 in operation S120.

The UE 100 may apply measurement configuration information, and transmit an RRC connection reconfiguration complete (RRCConnectionReconfigurationComplete) message to the eNB 102 as a response in operation S130.

The UE 100 may obtain WLAN information in operation S140. For example, the UE 100 measures a WLAN radio resource based on the above described measurement configuration information, and obtains one or more pieces of information out of a WLAN association state, a WLAN identifier (BSSID/HESSID/SSID), a MAC address, and an IP address.

The UE 100 may transmit the result of the above described WLAN measurement to the eNB 102 through a measurement report in operation S150. The measurement report may include WLAN state information, such as each WLAN connection status and the quality of access of a WLAN radio resource, which is measured by the UE 100 based on the measurement configuration information.

The eNB 102 may determine to allocate a WLAN radio resource with respect to predetermined E-RABs, and transmit an RRC connection reconfiguration message including new radio resource configuration information to the UE 100 in operation S160. The new radio resource configuration information may be determined based on the measurement report information that the UE 100 transmits in operation S150.

The UE 100 configures/applies, for/to the UE 100, the new radio resource configuration information for using a WLAN radio resource, based on an RRC connection reconfiguration message. The new radio resource configuration information used when the UE 100 uses a WLAN radio resource may include one or more piece of information out of: WLAN cell configuration information, WLAN split bearer configuration information of a WLAN split bearer that uses WLAN cells, and WLAN tunnel bearer configuration information. The WLAN split bearer configuration information indicates configuration information associated with a type of bearer that transmits data by simultaneously using a WLAN radio resource and an LTE radio resource. The WLAN tunnel bearer configuration information indicates configuration information associated with a type of bearer that transmits data using an IPsec tunnel through a WLAN radio resource.

Hereinafter, descriptions will be provided by using a tunnel bearer as an example for ease of description. However, the case of configuring a WLAN split bearer is also included in the scope of the present disclosure.

The WLAN cell configuration information may include one or more pieces of information out of: WLAN cell identifier information, WLAN mobility set information, WLAN band/frequency information, and WLAN identification information (BSSID/HESSID/SSIDs). Alternatively, the WLAN cell configuration information may include information that indicates a cell to which WLAN access authentication is to be performed, out of WLAN cells. For example, the WLAN cell configuration information may include one or more pieces of information out of: information indicating WLAN access authentication in a predetermined cell, information indicating a cell in which data transmission is to be performed through a WLAN radio resource, out of WLAN cells, and information indicating a WLAN primal)/cell. The information indicating a cell to which WLAN access authentication is to be performed may indicate information for indicating a cell to be added to the WLAN mobility set. Based on the information indicating a WLAN access authentication cell or the information indicating a cell in which WLAN data transmission is to be performed, the UE 100 may perform access authentication through a corresponding cell. Unlike the above, when the UE 100 successfully performs access authentication with respect to a WLAN cell in operation S140, and the eNB 102 is aware of the successful access authentication state through operation S150, the eNB 102 may transfer the WLAN cell configuration information to the UE 100 without including information indicating that WLAN access authentication is required in the corresponding cell. For example, information indicating a WLAN cell to be released from the WLAN mobility set may be included and transferred.

The tunnel bearer configuration information or tunnel configuration information may include at least one information out of: the IP address of the eNB 102 or the IP address of a gateway connected to the eNB 102 to be used for setting up a tunnel between the UE 100 and the eNB 102 through a WLAN radio resource; eps bearer identification information (eps-bearerIdentity); tunnel entity configuration information (e.g., an entity that processes at least one of IPsec header encapsulation/decapsulation, IPsec security association, key exchanging), security information, tunnel endpoint identification information of an eNB, DRB identification information (drb-Identity) of a DRB that uses an IPsec tunnel through a WLAN radio resource, and a tunnel endpoint identification information of a UE.

The UE 100 may apply the new radio resource configuration information and transmit an RRCConnectionReconfigurationComplete message to the eNB 102 as a response in operation S170.

Hereinafter, data may indicate only user plane data in a narrow sense, or the data may indicate data including control plane data in a broad sense.

The UE 100 may perform a WLAN association operation in operation S180 and S185.

For example, the UE 100 performs WLAN association with a WLAN node 101.

As another example, the UE 100 performs a WLAN access authentication with the WLAN node 101 (e.g., a WLAN AP/AC/termination). This may be performed through an access authentication procedure between the UE 100 and a 3GPP core network entity 103 (AAA/HSS or 3GPP AAA proxy), defined in 3GPP TS 33.402. The AAA/HSS 103 and/or 3GPP AAA proxy uses an IP address (or IPv6 prefix; hereinafter, an IP address is used for ease of description, and in this instance, the IP address includes IPv6 prefix) allocated by a WLAN node, with respect to a successful authentication. After the authentication, the UE 100 may be configured based on the IP address allocated from the WLAN node 101. The IP address may be used to transmit a message for setting up an IPsec tunnel with the UE 100, or may be used as a source address on an outer header of the IPsec tunnel between the UE 100 and the eNB 102. The UE 100 and the eNB 102 enable the eNB 102 to recognize the IP address of the UE 100 to set up the IPsec tunnel through a WLAN radio resource. For example, the AAA/HSS 103, the 3GPP AAA Proxy, a 3GPP core network entity (MME, PGW), or a core network entity including a DHCP server function may transfer, to the eNB 102, the IP address of the UE 100 that is allocated/updated/released from the WLAN node 101 when the UE IP address is allocated/updated/released. As another example, when the UE 100 is assigned with an IP address from the WLAN node 101 based on the radio resource configuration of the eNB 102 as in operation S160, the UE 100 i) includes the IP address of the UE 100 allocated from the WLAN node 101 in an RRC message (e.g., a WLAN status/information message), and ii) transfers the same to the eNB 102 through an interface (e.g., Uu interface) between the UE 100 and the eNB 102. In addition, when UE 100 is released from the association with the WLAN node 101 and the IP address is released, the UE 100 may report the same to the eNB 102. As another method, the UE 100 includes the IP address of the UE 100, which is assigned from the WLAN node 101, in a MAC CE, and transfers the same to the eNB 102 through an interface (Uu) between the UE 100 and the eNB 102.

As another example, a WLAN access authentication procedure between the UE 100 and the eNB 102 may be performed. The eNB 102 may use an IP address (or IPv6 prefix) allocated from the WLAN node 101, with respect to successful authentication. For example, when the UE 100 requests an IP address (or IPv6 prefix) through a DHCP protocol or the like, the WLAN node 101 may request, from the eNB 102, the IP address (or IPv6 prefix) on an authentication and authorization message. To enable the WLAN node 101 to perform an IP address allocating operation through the eNB 102, the UE 100 transfers information indicating the same (e.g., DHCP option information) to the WLAN node 101. The information indicating that the WLAN node 101 needs to perform the allocation of a UE IP address through the eNB 102 may be included in the RRCConnctionReconfiguration message in operation S160 and may be transferred to the UE 100. The eNB 102 designates an IP address (or IPv6 prefix) to be allocated through the corresponding WLAN node 101 based on the information on the authentication and authorization message that the WLAN node 101 requests from the eNB 102 (e.g., one or more pieces of information out of WLAN node identification information, a candidate IP address (or IPv6 prefix), and version information). The eNB 102 provides the same to the WLAN node 101. The WLAN node 101 provides the IP address (or IPv6 prefix) to the UE 100. After the authentication, the UE 100 may be configured based on the IP address allocated from the WLAN node 101. The IP address may be used to transmit a message for setting up an IPsec tunnel with the UE 100, or the IP address may be used as a source address on an outer header of the IPsec tunnel between the UE 100 and the eNB 102.

When the WLAN association of the UE 100 is completed, an internet key exchange (IKE) tunnel setup procedure may be started by the UE 100. The IP address of the eNB 102 or the IP address of a gateway connected to the eNB 102, which is required when the UE 100 sets up an IPsec tunnel, may be provided by being included in the RRCConnctionReconfiguration message of operation S160. Alternatively, when the WLAN association of the UE 100 is completed, the tunnel configuration information and tunnel bearer configuration information used for setting up a tunnel may be received from the eNB 102.

In the above descriptions, an example of the detailed method for a UE to configure a tunnel with an eNB through a WLAN radio resource has been provided with reference to drawings.

As described above, WLAN configures cell coverage that is smaller than an eNB cell, and time may be required to perform WLAN access authentication and tunnel setup, in order to enable a UE to use a WLAN radio resource. Therefore, a time delay may exist in data transmission and reception using an eNB radio resource and data transmission and reception using tunnel setup through a WLAN radio resource. Accordingly, various access authentication and tunnel setup procedures may be considered in addition to the tunnel setup and access authentication procedure using a WLAN radio resource, which has been described with reference to FIG. 1. Hereinafter, various embodiments in association with WLAN access authentication, tunnel setup, and a bearer configuring procedure using a tunnel will be described.

First Embodiment: A Method of Controlling Activation after Configuring a Bearer that Uses a WLAN Radio Resource to be in a Deactivated State As described above, after transmitting a WLAN measurement report to an eNB, a UE may receive, from the eNB, configuration information for applying new radio configuration.

For example, the UE receives an RRCConenctionReconfiguration message from the eNB and may apply, to the UE, the new radio resource configuration information included in the corresponding message.

For example, a UE may configure a tunnel entity, which controls data transmission/reception using a tunnel, to be in a deactivated (or suspended or disable) state, until data transmission becomes possible through a WLAN radio resource based on WLAN access authentication and tunnel setup. That is, the UE may configure the tunnel entity to be in a deactivated state up to operations S180 or S185 or S190 of FIG. 1. Alternatively, the UE may configure the tunnel entity to be in a deactivated state until operation S180, S185, or S190 is successfully performed after a predetermined timer starts.

Particularly, the UE may configure a tunnel entity based on new radio resource configuration information and may deactivate the tunnel entity. When the tunnel entity is deactivated, a downlink or uplink data transmission through a WLAN radio resource with respect to a tunnel bearer that uses the tunnel entity may be deactivated.

An eNB may be aware of whether the WLAN access authentication or tunnel setup is successfully performed or fails. The eNB may recognize the success or failure thereof in the process of WLAN access authentication or tunnel setup performed with a UE, or the eNB may determine the success or failure by receiving, from the UE, success or failure information associated with the WLAN access authentication or tunnel setup. When the UE successfully performs WLAN access authentication or tunnel setup, the eNB activates (resumes or enables) the deactivated tunnel bearer and transmits and receives user data. To this end, the eNB may transmit, to the UE, indication information for activating the deactivated tunnel bearer.

Until the tunnel bearer is configured to be deactivated or the deactivated tunnel bearer is activated, the eNB may transmit/receive data to/from the UE through an E-UTRAN bearer. Subsequently, through an RRCConnectionReconfiguration message, a MAC CE, or indication information for indicating activation, the eNB may correct the E-UTRAN bearer to a tunnel bearer and may configure the tunnel bearer with respect to the UE for the transmission of data. Through the above, a data transmission interruption problem caused by a time delay, which may occur in the process of WLAN access authentication and tunnel setup, may be overcome.

As another example, the UE configures a WLAN cell based on the new radio resource configuration information, and the UE may deactivate the WLAN cell. When the WLAN cell is deactivated, a downlink or uplink data transmission through a WLAN radio resource with respect to a tunnel bearer connected to the corresponding WLAN cell becomes deactivated. The eNB activates the deactivated WLAN cell, and the eNB transmits/receives user data through the tunnel bearer connected to the WLAN cell. The eNB may transmit, to the UE, indication information for activating the deactivated WLAN cell.

As another example, in the state in which a WLAN cell or a tunnel bearer connected to the corresponding WLAN cell is deactivated, a user data transmission is deactivated. However, it may be configured that the transmission of control data, such as WLAN access authentication and tunnel setup (tunneling setup), is possible. Through the above, the WLAN access authentication and tunneling setup may be possible. For example, until the WLAN cell is activated or the deactivated tunnel bearer is activated, the eNB may transmit/receive data to/from the UE through an E-UTRAN bearer. Subsequently, through an RRCConnectionReconfiguration message, a MAC CE, or activation indication information, the eNB may correct the E-UTRAN bearer to a tunnel bearer and may transmit data.

According to the above described embodiments of the present disclosure, a UE may configure a WLAN cell, a tunnel entity, and a tunnel bearer based on radio resource configuration information received from an eNB, and the UE may maintain them to be deactivated until tunnel setup and WLAN access authentication are completed. Subsequently, when the tunnel setup and WLAN access authentication are completed, a data transmission/reception through a tunnel may be performed based on an activation indication or a bearer correction indication from the eNB.

Second Embodiment: A Method of Configuring a Tunnel Bearer after Tunnel Setup

As described above, after transmitting a WLAN measurement report to an eNB, a UE may receive, from the eNB, configuration information for applying new radio configuration. For example, the UE receives an RRCConenction-Reconfiguration message from the eNB, and the UE may apply, to the UE, the new radio resource configuration information included in the corresponding message.

The new radio resource configuration information for using a WLAN radio resource may include WLAN cell configuration information. The WLAN cell configuration information may include one or more pieces of information out of: WLAN cell identifier information, WLAN mobility set information, WLAN band/frequency information, and WLAN identification information (BSSID/HESSID/SSIDs). Alternatively, in association with a cell to which WLAN access authentication is to be performed out of WLAN cells, the new radio resource configuration information may include information indicating the corresponding WLAN cell to which WLAN access authentication is to be performed. Alternatively, the new radio resource configuration information may include information indicating a cell (e.g., a WLAN primary cell) in which a data transmission through a WLAN radio resource is to be performed out of WLAN cells may be included.

Alternatively, the new radio resource configuration information for using a WLAN radio resource may include: information indicating WLAN access authentication and tunnel configuration information for configuring a tunnel (e.g., an IPsec tunnel) through a WLAN radio resource. The tunnel configuration information may include at least one piece of information out of: the IP address of an eNB or the IP address of a gateway connected to the eNB, which is required for setting up an IPsec tunnel; a key value; security association/negotiation information; an encryption algorithm; and authentication method information.

When the information indicating a WLAN access authentication cell or the information indicating a cell in which a WLAN data transmission is to be performed, which is included in the WLAN cell configuration, the UE may perform access authentication through a corresponding WLAN cell. Alternatively, the eNB may transmit an MAC CE that enables the UE to attempt access authentication with respect to a WLAN access authentication cell, and the UE may receive the corresponding MAC CE and may perform access authentication with respect to the WLAN access authentication cell.

Subsequently, the UE may set up a tunnel with the eNB through a WLAN radio resource based on the tunnel configuration information. In the process of setting up the tunnel through the WLAN radio resource, at least one piece of information out of a key value, security association/negotiation information, an encryption algorithm, and an authentication method may be included in an RRC message and may be transmitted or received through a Uu interface between the UE and the eNB. Alternatively, in the process of setting up the tunnel, at least one piece of information out of a key value, security association/negotiation information, an encryption algorithm, and an authentication method may be transmitted or received in a route through a WLAN radio resource.

When the tunnel is successfully set up, the eNB may transmit an RRCConnectionReconfiguration message including tunnel bearer configuration information to the UE. The RRCConnectionReconfiguration message including the tunnel bearer configuration information may be a message that is distinguished from a message that includes the WLAN access authentication indication information and the tunnel configuration information. That is, primarily, the UE receives the WLAN cell configuration information and the tunnel configuration information and performs WLAN access authentication and tunnel setup, and subsequently, the UE may additionally receive the tunnel bearer configuration information.

For example, the tunnel bearer configuration information includes one or more pieces of information out of: esp bearer identification information (eps-bearerIdentity) for each tunnel bearer, tunnel entity configuration information, security information, tunnel endpoint identification information of an eNB, DRB identification information (drb-Ientity), and tunnel endpoint identification information of an UE. The tunnel entity indicates an entity that processes one or more operations out of an IPsec header encapsulation/decapsulation, IPsec security association, and key exchanging.

After configuring a tunnel bearer, the UE may send an RRCConnectionReconfigurationComplete message as a response. For example, until the tunnel setup is completed or successfully performed, the eNB may transmit/receive data to/from the UE through an E-UTRAN bearer. Subsequently, the eNB may correct the E-UTRAN bearer to a tunnel bearer through the RCConnectionReconfiguration message, and the eNB may use the tunnel bearer.

The above descriptions provide a procedure in which the UE completes WLAN access authentication and tunnel setup using WLAN cell configuration information and tunnel configuration information included in radio resource configuration information received from the eNB, additionally receives tunnel bearer configuration information, and perform a data transmission/reception using a tunnel bearer. Through the above, the UE transmits/receives data to/from the eNB through an E-UTRAN bearer until the tunnel bearer is configured, and thus, the data interruption problem may be overcome.

Third Embodiment: A Method of Simultaneously Setting Up a Tunnel Bearer and an E-UTRAN Bearer Associated Therewith As described above, after transmitting a WLAN measurement report to an eNB, a UE may receive, from the eNB, configuration information for applying new radio configuration. For example, the UE receives an RRCConenction-Reconfiguration message from the eNB, and may apply, to the UE, the new radio resource configuration information included in the corresponding message.

The new radio resource configuration information for using a WLAN radio resource may include WLAN cell configuration information and tunnel bearer configuration information. Additionally, the radio resource configuration information may include E-UTRAN bearer configuration information of an E-UTRAN that is associated with a tunnel bearer. A WLAN cell has a smaller coverage than an E-UTRAN cell, and the WLAN cell has difficulty in controlling a radio resource. Therefore, an eNB includes, in the radio resource configuration information, E-UTRAN bearer configuration information (DRB-ToAddMode) of an E-UTRAN bearer (e.g., fallback bearer) that uses an E-UTRAN cell in association with a tunnel bearer, and the eNB enables the E-UTRAN bearer to be configured for a UE so that the UE quickly switches a bearer when a problem occurs in a WLAN radio link. The UE identifies a predetermined radio bearer as an E-UTRAN bearer associated with a tunnel bearer based on one of eps bearer identification information (eps-bearerIdentity), DRB identification information (drb-Identity), and indication information indicating a bearer associated with a tunnel bearer.

For example, the UE may transmit or receive data through the E-UTRAN bearer associated with the tunnel bearer until a data transmission through a WLAN radio resource is possible according to WLAN access authentication and tunnel setup. When a data transmission through a WLAN radio resource becomes possible after the WLAN cell authentication, the UE may deactivate the E-UTRAN bearer (or a bearer RLC/PDCP entity). When the E-UTRAN bearer is deactivated, an RLC entity and a PDCP entity may be reconfigured.

As another example, the UE may deactivate the E-UTRAN bearer (or bearer RLC/PDCP entity) associated with the tunnel bearer until the UE detects a failure from a WLAN radio link or the UE releases the tunnel bearer. When the UE detects a failure from the WLAN radio link, the UE may activate the E-UTRAN bearer associated with the tunnel bearer.

As another example, the eNB may transfer, to the UE, information indicating a bearer to be used out of E-UTRAN bearers associated with the tunnel bearer. The UE may receive or transmit data through the corresponding bearer entity based on the indication information.

The above mentioned failure in the WLAN radio link may indicate one or more cases out of the case in which the quality of a WLAN radio link (e.g., beacon RSSI, channel utilization, backhaul rate, WLAN signal intensity) is lower than a predetermined threshold; the case in which the quality of a WLAN radio link is maintained to be lower than a predetermined threshold value during a predetermined period of time; the case in which a feedback with respect to a WLAN transmission is not received during a predetermined period of time; the case in which at least a predetermined number of losses is detected from a feedback with respect to a WLAN transmission; the case in which WLAN access authentication fails; and the case in which WLAN access authentication is not successfully performed during a predetermined period of time.

The above descriptions provide an embodiment in which the eNB transmits, to the UE, WLAN cell configuration information for WLAN access authentication and the tunnel bearer configuration information and associated E-UTRAN bearer configuration information for configuring a tunnel bearer, and the UE prevents data loss using the E-UTRAN bearer associated with the tunnel bearer.

Fourth Embodiment: A Method of Receiving Tunnel Bearer Configuration Information after WLAN Access Authentication As described above, after transmitting a WLAN measurement report to an eNB, a UE may receive, from the eNB, configuration information for applying new radio configuration. For example, the UE receives an RRCConenction-Reconfiguration message from the eNB and may apply, to the UE, the new radio resource configuration information included in the corresponding message.

The new radio resource configuration information for using a WLAN radio resource may include WLAN cell configuration information. Alternatively, the new radio resource configuration information or the WLAN cell configuration information may include information indicating WLAN access authentication. For example, the WLAN cell configuration information may include one or more pieces of information out of: WLAN cell identifier information, WLAN mobility set information, WLAN band/frequency information, and WLAN identification information (BSSID/HESSID/SSIDs). In association with a cell to which WLAN access authentication is to be performed out of WLAN cells, the new radio resource configuration information may include information indicating the corresponding WLAN cell to which WLAN access authentication is to be performed. Alternatively, the new radio resource configuration information may include information indicating a cell (e.g., a WLAN primal)/cell) in which a data transmission through a WLAN radio resource is to be performed out of WLAN cells.

When the UE receives the information indicating a WLAN access authentication cell or the information indicating a cell in which WLAN data transmission is to be performed, which is included in the WLAN cell configuration, the UE may perform access authentication through a corresponding WLAN cell. Alternatively, in the case in which the eNB transmits an MAC CE that enables the UE to attempt access authentication with respect to a WLAN access authentication cell, when the UE receives the corresponding MAC CE, the UE may perform access authentication with respect to the WLAN access authentication cell.

The eNB may determine whether the UE successfully performs WLAN access authentication in the WLAN access authentication process of the UE. Alternatively, the eNB may determine that the WLAN access authentication of the UE is successfully performed, by receiving successful WLAN access authentication information from the UE. To this end, the UE may transmit a WLAN access confirmation message to the eNB when the WLAN access authentication is successfully performed.

After determining that the WLAN access authentication of the UE is successfully performed, the eNB may transmit, to the UE, an RRCConnectionReconfiguration message including at least one piece of information out of tunnel configuration information for setting up a tunnel and tunnel bearer configuration information. The RRCConnectionReconfiguration message including the tunnel configuration information and/or tunnel bearer configuration information may be transferred through a message that is different from a message that transmits the WLAN cell configuration information (including WLAN access authentication indication information).

When the UE receives a higher layer signaling (e.g., an RRCConenctionReconfiguration message) including the tunnel configuration information and/or tunnel bearer configuration information, the UE may set up a tunnel with the eNB through a WLAN radio resource based on the tunnel configuration information, may configure a tunnel bearer, and may transmit a confirmation message to the eNB. The confirmation message may be included in an RRCConnectionReconfigurationComplete message.

Alternatively, when the UE receives a higher layer signaling including the tunnel configuration information and/or tunnel bearer configuration information, the UE may apply the corresponding configuration information and transmit the RRCConnectionReconfigurationComplete message to the eNB. Subsequently, the UE may set up a tunnel based on the tunnel configuration information. Additionally, when a problem occurs in the WLAN radio link during the tunnel setup process, the UE may report the same to the eNB through an RRC message.

For example, until WLAN access authentication is completed or successfully performed, the eNB may transmit/receive data to/from the UE through an E-UTRAN bearer. Subsequently, through an RRCConnectionReconfiguration message or a MAC CE, the eNB may provide an indication of switching the E-UTRAN bearer to a tunnel bearer and transmitting data. The UE may transmit/receive data using an IPsec tunnel through a WLAN radio resource with respect to the tunnel bearer.

As described above, in the present embodiment WLAN cell configuration information for WLAN access authentication, and a higher layer signaling for setting up a tunnel and for configuring a tunnel bearer may be transmitted sequentially. Through the above, the UE and the eNB may perform a data transmission/reception operation using a WLAN radio resource without interruption, by an indication of configuring tunnel bearer after the WLAN access authentication of the UE is successfully completed.

Hereinafter, the operations of the fourth embodiment will be described in detail with reference to drawings.

Figure 2:
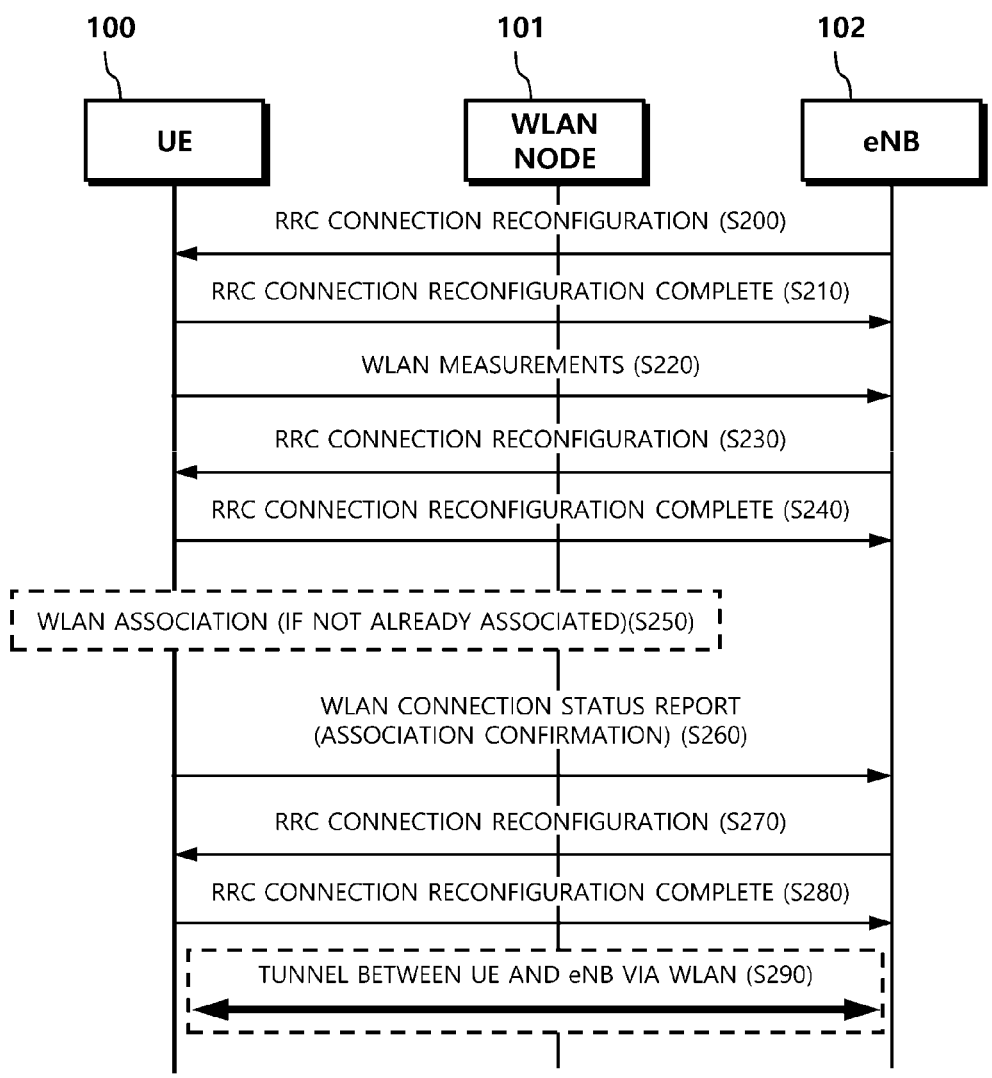
FIG. 2 is a diagram illustrating a tunneling-based WLAN radio resource adding procedure according to another embodiment.

FIG. 2 is a diagram illustrating a tunneling-based WLAN radio resource adding procedure according to an embodiment.

The UE 100 in the present embodiment may receive, from the eNB 102, measurement configuration information for measuring WLAN in operation S200. The measurement configuration information may be received by being included in a higher layer signaling. For example, the measurement configuration information may be received by being included in an RRC connection reconfiguration message. The measurement configuration information may include a parameter for measuring a WLAN cell that is required when the UE 100 and the eNB 102 perform data communication using a WLAN radio resource. That is, the eNB 102 configures a WLAN measurement operation for LTE-WLAN aggregation technology, with respect to the UE through the RRC connection reconfiguration message.

The UE 100 configures the received measurement configuration information for the UE 100 and transmits a response message to the eNB 102. The response message may be an RRC connection reconfiguration complete message in operation S210.

Subsequently, the UE 100 may report, to the eNB 102, the result of the WLAN measurement, which is measured based on the measurement configuration information, in operation S220. The eNB 102 configures the UE 100 for the LTE-WLAN aggregation technology based on the WLAN measurement information, which is received from the UE 100.

The eNB 102 may transmit, to the UE 100, the WLAN cell configuration information for transmitting/receiving data using a WLAN radio resource in operation S230. The WLAN cell configuration information may be transmitted to the UE 100 by being included in the RRC connection reconfiguration message. The WLAN cell configuration information may include at least one piece of information out of WLAN mobility set information and WLAN identification information. Also, the WLAN cell configuration information may include information associated with a WLAN cell to which the UE 100 is to perform a WLAN access authentication operation (e.g., indication information that indicates a WLAN cell).

The UE 100 may apply the WLAN cell configuration information to the UE 100 and transmits a response message to the eNB 102 in operation S240. The response message may be included in an RRC connection reconfiguration complete message.

The UE 100 may perform a WLAN association operation based on the received WLAN cell configuration information in operation S250. The WLAN association operation may be performed between the WLAN node 101 and the UE 100. Through the WLAN association operation, the UE 100 may successfully access WLAN. Various WLAN access authentication operations described with reference to FIG. 1 may be applied as the WLAN association operation.

The UE 100 may transmit, to the eNB 102, WLAN connection status information based on the performance of the WLAN association operation in operation S260. For example, when the UE 100 completes WLAN access authentication, the UE 100 transmits, to the eNB 102, information that confirms WLAN association. The eNB 102 may determine whether the UE 100 successfully accesses the WLAN node 101 using the received WLAN connection status information.

The eNB 102 receives the WLAN connection status information from the UE 100, and transmits tunnel configuration information for setting up a tunnel between the UE 100 and the eNB 102 using a WLAN radio resource in operation S270. The tunnel configuration information may be transmitted to the UE 100 by being included in a higher layer signaling (e.g., an RRC connection reconfiguration message). The tunnel configuration information may include parameter information that is required for configuring an IPsec tunnel. Alternatively, the eNB 102 may further include tunnel bearer configuration information in the higher layer signaling of operation S270, and may transmit the same. The tunnel bearer configuration information may include bearer identification information associated with a bearer that is configured to transmit/receive data using a tunnel. For example, the tunnel bearer configuration information may include DRB identification information associated with a DRB that is configured to use a tunnel.

The UE 100 may receive the higher layer signal including the tunnel configuration information or the tunnel bearer configuration information, configure the same with respect to the UE 100, and transmit a response message to the eNB 102, in operation S280. The response message may be included in an RRC connection reconfiguration message.

The UE 100 sets up an IPsec tunnel with the eNB 102 through a WLAN radio resource based on the tunnel configuration information and transmits/receives data of a radio bearer based on the tunnel bearer configuration information by using the IPsec tunnel in operation S290.

As described above, the UE 100 may transmit/receive data by setting up an IPsec tunnel with the eNB 102 through a WLAN radio resource using a higher layer signaling. Also, after successfully performing WLAN association using the information for WLAN access authentication, the UE 100 receives information for setting up a tunnel and for configuring a tunnel bearer and configures the same for the UE 100, thereby minimizing a delay time caused by access authentication and tunnel setup. That is, a data transmission/reception operation through a tunnel may be performed immediately after the tunnel is set, without an additional operation, such as deactivating a tunnel entity during a delay time caused by WLAN access authentication.

Hereinafter, the operations of the fourth embodiment will be described from the perspective of a UE and an eNB.

Figure 3:
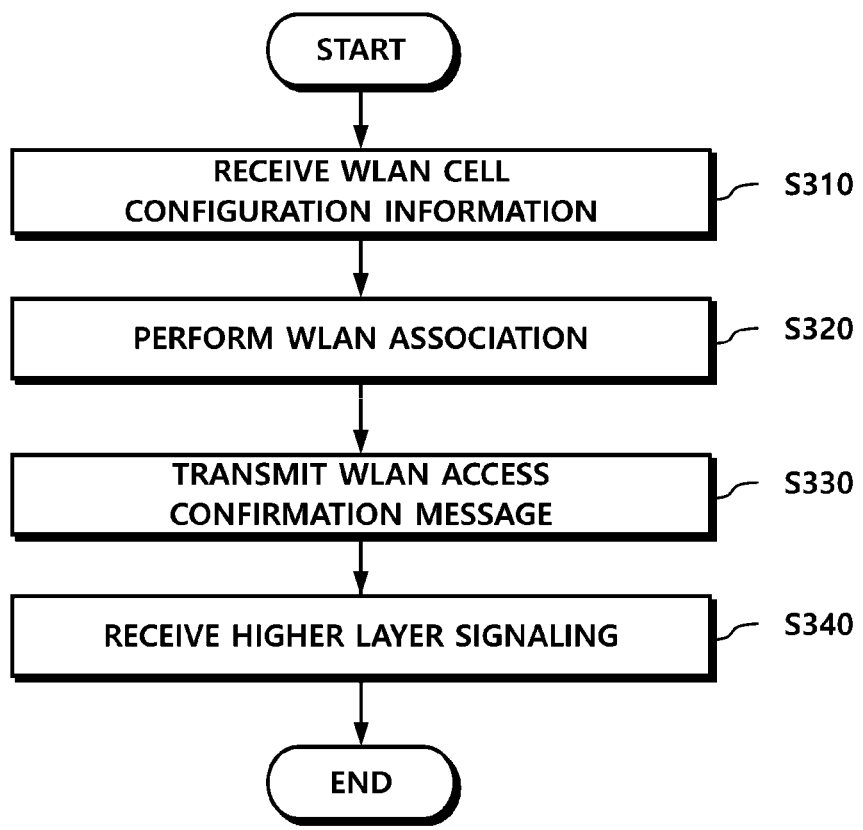
FIG. 3 is a diagram illustrating operations of a UE according to an embodiment.

FIG. 3 is a diagram illustrating operations of a UE according to an embodiment.

The operations of a UE according to an embodiment includes an operation of receiving, from an eNB, wireless local area network (WLAN) cell configuration information for transmitting/receiving data using a WLAN radio resource in operation S310. As described above, the WLAN cell configuration information may include a parameter that is required when the UE accesses a WLAN cell. For example, the WLAN cell configuration information may include one or more pieces of information out of: WLAN cell identifier information, WLAN mobility set information, WLAN band/frequency information, and WLAN identification information (BSSID/HESSID/SSIDs). Alternatively, the WLAN cell configuration information may include information that indicates a cell, out of WLAN cells, to which WLAN association authentication is to be performed. For example, the WLAN cell configuration information may include one or more pieces of information out of: information indicating WLAN association authentication in a predetermined cell; information indicating a cell, out of WLAN cells, in which data transmission is to be performed through a WLAN radio resource; and information indicating a WLAN primal)/cell.

The operations of the UE include performing a WLAN association operation based on the WLAN cell configuration information in operation S320. The UE performs an access authentication operation with respect to a WLAN cell based on the WLAN cell configuration information. The WLAN cell to which the access authentication operation is to be performed may be specified by the WLAN cell configuration information or may be specified by a MAC CE received from the eNB. Alternatively, the WLAN cell may be specified by other various methods.

Subsequently, the operations of the UE include an operation of transmitting a WLAN access confirmation message to the eNB in operation S330. When WLAN access authentication is completed, the UE may transmit, to the eNB, a WLAN connection status report including information associated with a WLAN access state in operation S320. The eNB determines whether the UE completes or fails WLAN access authentication based on the received WLAN connection status report.

The operations of the UE include an operation of receiving tunnel configuration information for setting up a tunnel between the eNB and the UE through a WLAN radio resource, from the eNB through a higher layer signaling, in operation S340. For example, when WLAN access authentication is completed, the UE may receive, from the eNB, a parameter required for setting up a tunnel using a WLAN radio resource. The parameter is received by being included in the tunnel configuration information, and the parameter may be received through an RRC connection reconfiguration message.

The higher layer signaling including the tunnel configuration information may further include tunnel bearer configuration information for configuring a radio bearer that uses a tunnel. The tunnel bearer configuration information may include DRB identification information associated with a DRB that is configured to transmit/receive data using a tunnel. The UE may configure a radio bearer, which is specified based on the DRB identification information out of radio bearers, as a radio bearer that uses a tunnel.

Through the above, the UE configures a tunnel with the eNB using a WLAN radio resource and transmits/receives data by minimizing a time delay associated with WLAN access authentication.

Figure 4:
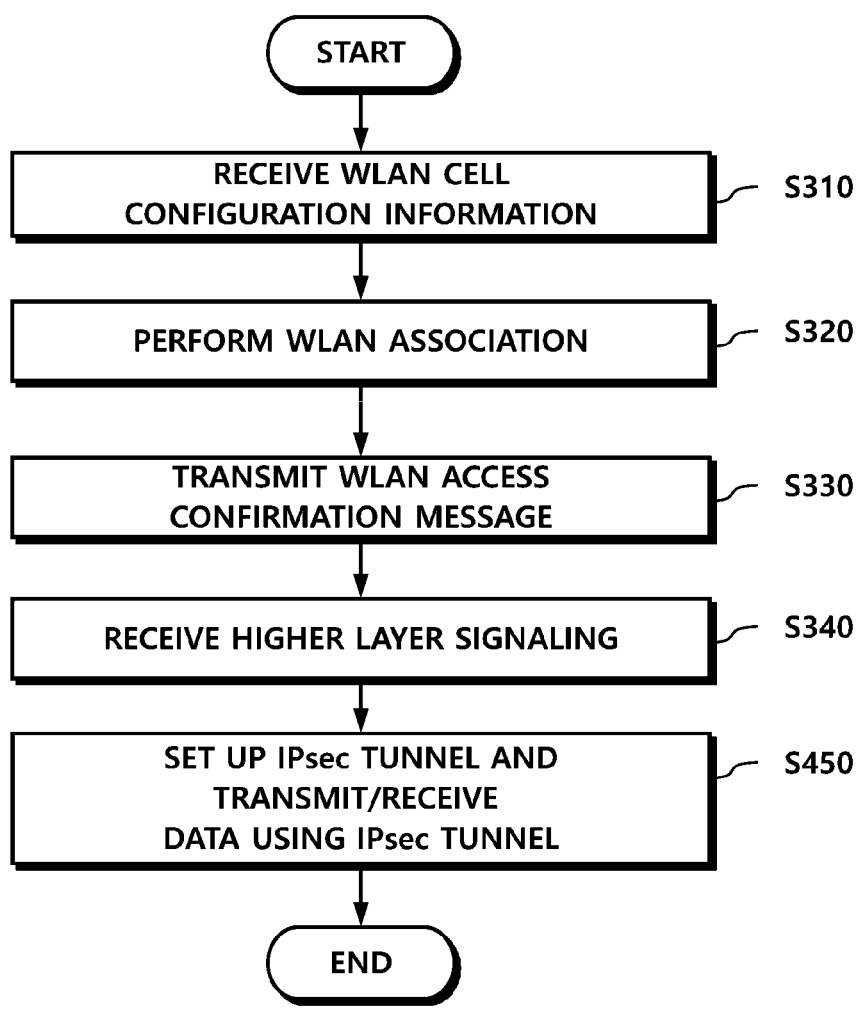
FIG. 4 is a diagram illustrating operations of a User Equipment (UE), including tunnel setup, according to an embodiment.

FIG. 4 is a diagram illustrating operations of a UE, including tunnel setup, according to another embodiment.

Referring to FIG. 4, the operations of a UE further include an operation of i) setting up an internet protocol security (IPsec) tunnel through a WLAN radio resource based on tunnel configuration information and ii) transmitting/receiving data to/from an eNB using the IPsec tunnel in operation S450. Operations S310 to S330 are performed in the same manner as the descriptions in FIG. 3, and thus, detailed descriptions thereof will be omitted.

The UE may set up an IPsec tunnel with the eNB using the tunnel configuration information of the higher layer signaling received in operation S340. Also, the UE may configure a radio bearer that uses the IPsec tunnel based on the tunnel bearer configuration information.

The UE may transmit/receive data of the tunnel bearer to/from the eNB using the IPsec tunnel that is set using the WLAN radio resource. To this end, the tunnel bearer may be associated with a tunnel entity. The tunnel entity adds an IPsec header to the data of a higher layer, transfers the same to a lower layer, and removes an IPsec header from data received from a lower layer and transfers the same to a higher layer.

Figure 5:
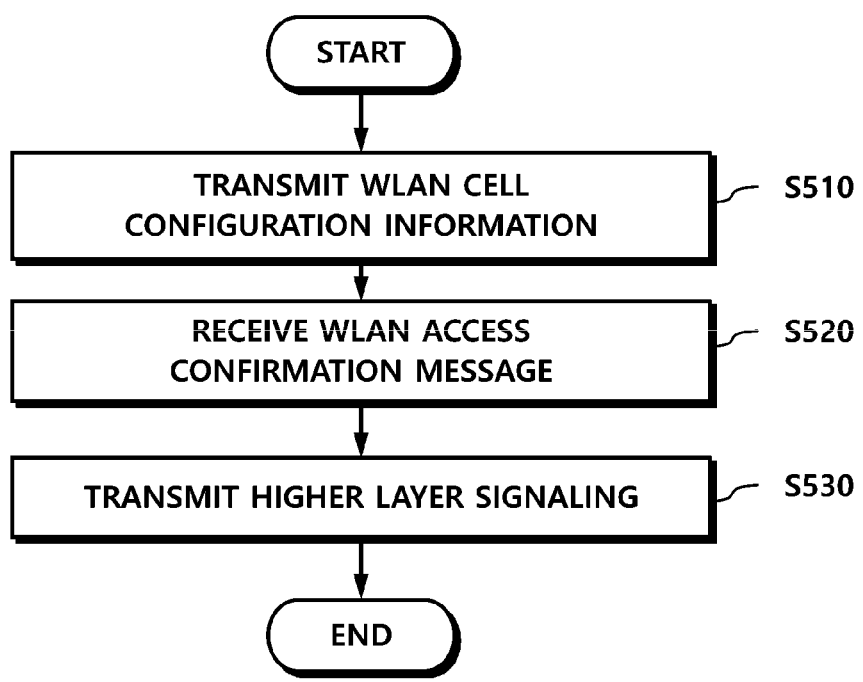
FIG. 5 is a diagram illustrating operations of an evolved Node B (eNB) according to an embodiment.

FIG. 5 is a diagram illustrating operations of an eNB according to an embodiment.

Referring to FIG. 5, the operations of eNB include an operation of transmitting, to a UE, wireless local area network (WLAN) cell configuration information for transmitting/receiving data using a WLAN radio resource in operation S510. The WLAN cell configuration information may include a parameter that is required when the UE accesses a WLAN cell. For example, the WLAN cell configuration information may include one or more pieces of information out of: WLAN cell identifier information, WLAN mobility set information, WLAN band/frequency information, and WLAN identification information (BSSID/HESSID/SSIDs). Alternatively, the WLAN cell configuration information may include information that indicates a cell, out of WLAN cells, to which WLAN association authentication is to be performed. For example, the WLAN cell configuration information may include one or more pieces of information out of: information indicating WLAN association authentication in a predetermined cell; information indicating a cell, out of WLAN cells, in which data transmission is to be performed through a WLAN radio resource; and information indicating a WLAN primary cell. The eNB transmits the WLAN cell configuration information that is required when the UE performs an access authentication operation with respect to the WLAN cell, in advance separately from tunnel configuration information.

Also, the operations of the eNB include an operation of receiving a WLAN access confirmation message from the UE in operation S520. The UE performs an association operation with respect to the WLAN cell based on the WLAN cell configuration information, and the UE transmits information associated with a WLAN cell access state to the eNB. The eNB determines the WLAN cell access state of the UE based on the WLAN cell access state information included in the received WLAN access confirmation message.

Also, the operations of the eNB include an operation of transmitting the tunnel configuration information for setting up a tunnel between the eNB and the UE through a WLAN radio resource, to the UE through a higher layer signaling, in operation S530. When WLAN cell access authentication of the UE is completed, the eNB may transmit a parameter required for the tunnel setup using a WLAN radio resource. The parameter may be transmitted by being included in the tunnel configuration information and transmitted through an RRC connection reconfiguration message.

The higher layer signaling including the tunnel configuration information may further include tunnel bearer configuration information for configuring a radio bearer that uses a tunnel. The tunnel bearer configuration information may include DRB identification information associated with a DRB that is configured to transmit/receive data using a tunnel. The eNB may configure a radio bearer, which is specified based on the DRB identification information out of radio bearers, as a radio bearer that uses a tunnel.

Figure 6:
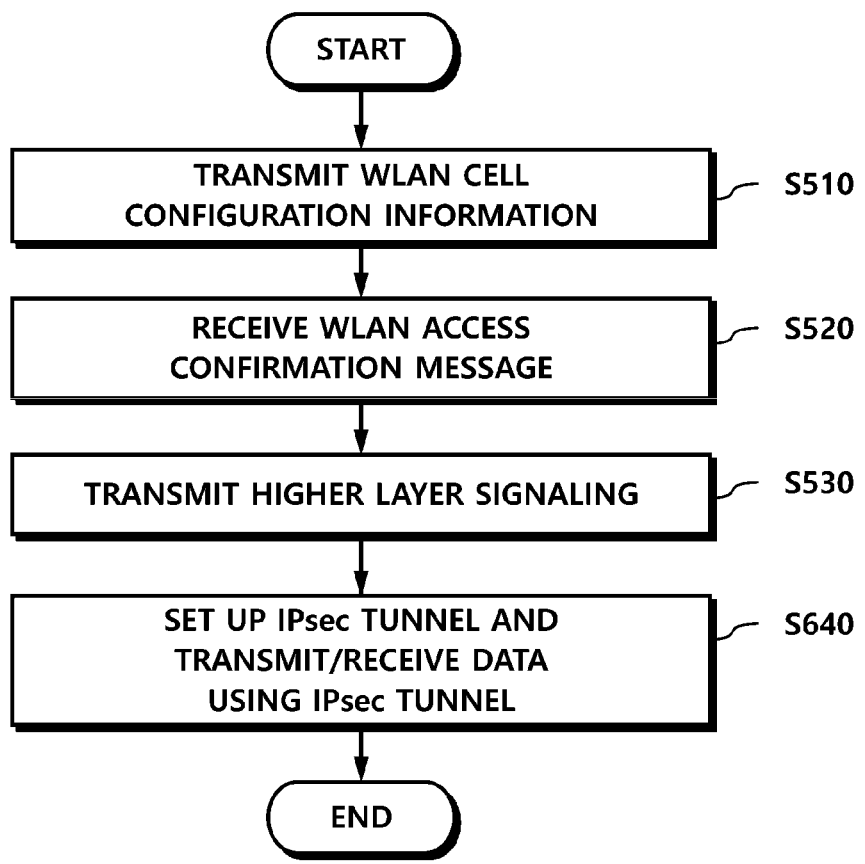
FIG. 6 is a diagram illustrating operations of an eNB, including tunnel setup, according to an embodiment.

FIG. 6 is a diagram illustrating operations of an eNB, including tunnel setup, according to another embodiment.

Referring to FIG. 6, the operations of the eNB further include an operation of i) setting up an IPsec tunnel through a WLAN radio resource based on tunnel configuration information and ii) transmitting/receiving data to/from a UE using the IPsec tunnel in operation S640. Operations S510 to S530 are performed in the same manner as the operations of FIG. 5, and thus, detailed descriptions thereof will be omitted.

The eNB may set up an IPsec tunnel with the UE based on the tunnel configuration information. Also, the eNB may configure a radio bearer that uses the IPsec tunnel based on the tunnel bearer configuration information. The eNB may transmit/receive data of the tunnel bearer to/from the UE using the IPsec tunnel that is set using the WLAN radio resource. To this end, the tunnel bearer may be associated with a tunnel entity, and the tunnel entity adds an IPsec header to the data of a higher layer and transfers the same to a lower layer, removes an IPsec header from data received from a lower layer, and transfers the same to a higher layer. A tunnel entity of the eNB may be configured to peer with a tunnel entity of the UE.

As described above, the present embodiments may reduce a delay associated with WLAN access authentication and tunnel setup and the interruption of a data transmission, which is caused by a small coverage, and may provide an IPsec tunnel-based LTE-WLAN aggregation that is capable of reusing a legacy WLAN AP.

A UE and an eNB will be described with reference to drawings, which may perform all or some of the operations in the present embodiments of the present invention that have been described in the above descriptions.

Figure 7:
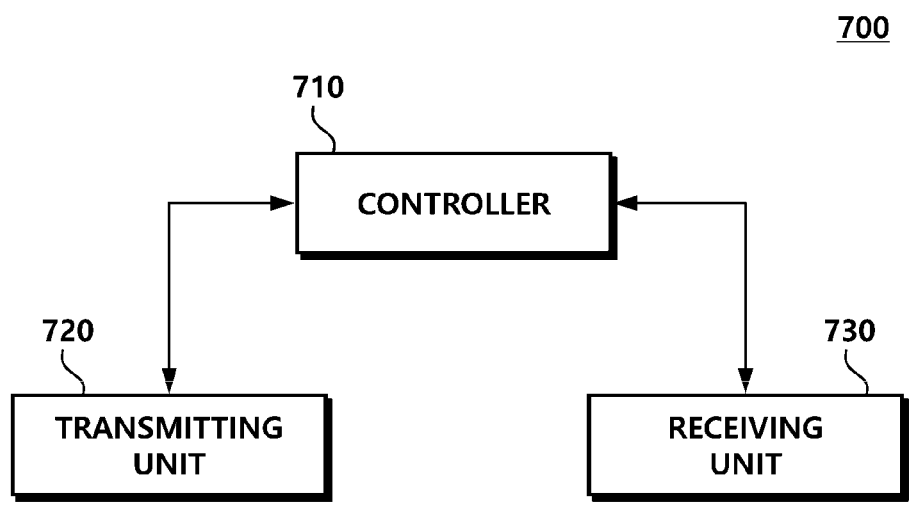
FIG. 7 is a block diagram illustrating a configuration of a UE according to an embodiment.

FIG. 7 is a block diagram illustrating a configuration of a UE according to an embodiment.

Referring to FIG. 7, a UE 700 may include a receiving unit 730 that receives, from an eNB, WLAN cell configuration information for transmitting/receiving data using a WLAN radio resource; a controller 710 that performs a WLAN association operation based on the WLAN cell configuration information; and a transmitting unit 720 that transmits a WLAN access confirmation message to the eNB.

The receiving unit 730 may receive tunnel configuration information for setting up a tunnel between the eNB and the UE through a WLAN radio resource, from the eNB through a higher layer signaling, after the WLAN access confirmation message is transmitted.

The receiving unit 730 may receive tunnel bearer configuration information through the higher layer signaling, and the tunnel bearer configuration information may include information for configuring a radio bearer that uses a tunnel. For example, the tunnel bearer configuration information may include DRB identification information associated with a DRB that is configured to use a tunnel.

The controller 710 may set up an IPsec tunnel with the eNB based on the tunnel configuration information and configure a tunnel bearer using the tunnel bearer configuration information.

Also, the controller 710 controls the general operations of the UE 700 in association with a detailed control procedure and a data transmission method of a tunnel based-LTE-WLAN aggregation technology that uses a WLAN radio resource, which are required to implement the above described embodiments.

In addition, the transmitting unit 720 and the receiving unit 730 may be used for transmitting and receiving, to/from the eNB, a signal, a message, or data required to implement the above described present invention.

Figure 8:
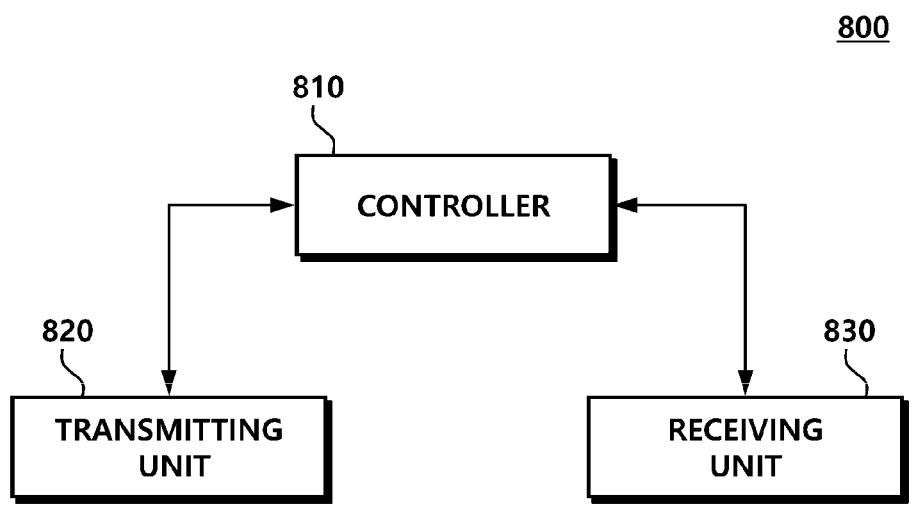
FIG. 8 is a block diagram illustrating a configuration of an eNB according to an embodiment.

FIG. 8 is a block diagram illustrating a configuration of an eNB according to an embodiment.

Referring to FIG. 8, an eNB 800 may include: a transmitting unit 820 that transmits, to a UE, WLAN cell configuration information for transmitting/receiving data using a WLAN radio resource; and a receiving unit 830 that receives a WLAN access confirmation message from the UE.

The transmitting unit 820 may transmit tunnel configuration information for setting up a tunnel between the eNB and the UE through a WLAN radio resource, to a UE through a higher layer signaling, after the WLAN access confirmation message is received. Also, the transmitting unit 820 may transmit, to the UE, the tunnel bearer configuration information for configuring a radio bearer that uses a tunnel. The tunnel bearer configuration information may be transmitted together with the tunnel configuration information.

The controller 810 may set an IPsec tunnel through a WLAN radio resource based on the tunnel configuration information, and may configure a tunnel bearer.

Also, the controller 810 controls the general operations of the eNB 800 in association with a detailed control procedure and a data transmission method of a tunnel based-LTE-WLAN aggregation technology that uses a WLAN radio resource, which are required to implement the above described embodiments.

In addition, the receiving unit 830 may receive, from the UE, uplink control information, uplink data, and a message, through a corresponding channel. The transmitting unit 820 may transmit, to the UE, downlink control information, downlink data, and a message, through a corresponding channel.

The content associated with the standard or standard documents, mentioned in the above described embodiments, has been omitted for simple description of the present specifications, but it may be a part of the present specifications. Therefore, when a part of the content and documents associated with the standard is added to the present specifications or is specified in claims, it should be construed as a part of the present disclosure.

Although a preferred embodiment of the present disclosure has been described for illustrative purposes, those skilled in the art will appreciate that various modifications, additions and substitutions are possible, without departing from the scope and spirit of embodiments of the present disclosure as disclosed in the accompanying claims. Therefore, exemplary aspects of the present disclosure have not been described for limiting purposes. The scope of the present disclosure shall be construed on the basis of the accompanying claims in such a manner that all of the technical ideas included within the scope equivalent to the claims belong to the present disclosure.

What is claimed is:

1. A method for a User Equipment (UE) to transmit and receive data, the method comprising:
   transmitting and receiving data through an Evolved-UMTS terrestrial radio access network (E-UTRAN) bearer;
   receiving, from an evolved Node B (eNB) through the E-UTRAN bearer, data and wireless local area network (WLAN) cell configuration information, wherein the WLAN cell configuration information is for indicating a selected WLAN cell and accessing the selected WLAN cell for using a WLAN radio resource of the selected WLAN cell;
   performing WLAN association based on the WLAN cell configuration information;
   transmitting a WLAN access confirmation message to the eNB;
   receiving, from the eNB through a higher layer signaling, tunnel configuration information which is for setting up a tunnel between the UE and the eNB using the WLAN radio resource of the selected WLAN cell and for configuring a data radio bearer to the tunnel to transmit and receive data after setting up the tunnel;
   setting up an internet protocol security (IPsec) tunnel between the UE and the eNB through the WLAN radio resource of the selected WLAN cell, based on the tunnel configuration information;
   while performing the WLAN association and setting up the IPsec tunnel, maintaining the IPsec tunnel in a deactivated state and transmitting data through the E-UTRAN bearer, wherein the IPsec tunnel is maintained in a deactivated state for a predetermined amount of time after the WLAN association and setting up the IPsec tunnel are complete; and
   activating the IPsec tunnel and transmitting (uplink) or receiving of (downlink) user data to/from the eNB through the data radio bearer using the IPsec tunnel based on the tunnel configuration information,
   wherein the receiving of the tunnel configuration information is performed after the transmitting of the WLAN access confirmation message is performed;
   wherein:
   the WLAN cell configuration information includes WLAN mobility set information; and
   the tunnel configuration information includes information for instructing a controller of the UE to start processing data transmitted or received through the tunnel between the UE and the eNB;
   wherein the IPsec tunnel is set in a layer higher or lower than a packet data convergence protocol (PDCP) layer;
   wherein the controller of the UE is configured to perform an IPsec header encapsulation or decapsulation for the data transmitted or received through the IPsec tunnel,
   wherein the higher layer signaling further includes tunnel bearer configuration information for configuring a radio bearer that uses the tunnel, and
   wherein the tunnel bearer configuration information includes the data radio bearer (DRB) identification information that indicates the radio bearer related to the tunnel and start using the indicated radio bearer to transmit and receive data.

2. The method of claim 1, wherein the WLAN cell configuration information further includes WLAN identification information that indicates the selected WLAN cell based on a measurement report from the UE.

3. A method for an evolved Node B (eNB) to transmit and receive data, the method comprising:
   transmitting and receiving data through an Evolved-UMTS terrestrial radio access network (E-UTRAN) bearer formed to a user equipment (UE);
   transmitting, to the UE, wireless local area network (WLAN) cell configuration information for indicating a selected WLAN cell and accessing the selected WLAN cell for using a WLAN radio resource of the selected WLAN cell;
   receiving a WLAN access confirmation message from the UE;
   transmitting, to the UE through a higher layer signaling, tunnel configuration information which is for setting up a tunnel between the UE and the eNB using the WLAN radio resource of the selected WLAN cell and for configuring a data radio bearer to the tunnel to transmit and receive data after setting up the tunnel;
   setting up an internet protocol security (IPsec) tunnel between the eNB and the UE through the WLAN radio resource of the selected WLAN cell, based on the tunnel configuration information; and
   while performing WLAN association based on the WLAN cell configuration information and setting up the IPsec tunnel, maintaining the transmitting and receiving data through the E-UTRAN bearer to the UE, activating the IPsec tunnel and, transmitting (downlink) or receiving of (uplink) user data to/from the UE through the IPsec tunnel,
   wherein the transmitting of the tunnel configuration information is performed after the receiving of the WLAN access confirmation message is performed; and
   wherein the IPsec tunnel is maintained in a deactivated state for a predetermined amount of time after the tunnel configuration information is transmitted;
   wherein:
   the WLAN cell configuration information includes WLAN mobility set information; and
   the tunnel configuration information includes information for instructing a controller of the eNB to start processing data transmitted or received through the tunnel between the eNB and the UE;
   wherein the IPsec tunnel is set in a layer higher or lower than a packet data convergence protocol (PDCP) layer;
   wherein the controller of the eNB is configured to perform an IPsec header encapsulation or decapsulation for the data transmitted or received through the IPsec tunnel,
   wherein the higher layer signaling further includes tunnel bearer configuration information for configuring a radio bearer that uses the tunnel, and
   wherein the tunnel bearer configuration information includes the data radio bearer (DRB) identification information that indicates the radio bearer related to the tunnel and start using the indicated radio bearer to transmit and receive data.

4. The method of claim 3, wherein the WLAN cell configuration information further includes WLAN identification information that indicates the selected WLAN cell based on a measurement report from the UE.

5. A User Equipment (UE) that transmits and receives data, the UE comprising:
- a receiver configured to receive data from an evolved Node B (eNB) through an Evolved-UMTS terrestrial radio access network (E-UTRAN) bearer and wireless local area network (WLAN) cell configuration information, wherein the WLAN cell configuration information is for indicating a selected WLAN cell and accessing the selected WLAN cell for using a WLAN radio resource of the selected WLAN cell;
- a controller configured to perform WLAN association based on the WLAN cell configuration information; and
- a transmitter configured to transmit data through the E-UTRAN bearer and transmit a WLAN access confirmation message to the eNB after performing the WLAN association,
- wherein the receiver further receives tunnel configuration information from the eNB through a higher layer signaling, where the tunnel configuration information is received after the transmitting of the WLAN access confirmation message, and where the tunnel configuration information is for setting up a bidirectional tunnel between the UE and the eNB using the WLAN radio resource of the selected WLAN cell and for configuring a data radio bearer to the tunnel to transmit and receive user data after setting up the tunnel, and wherein the IPsec tunnel is maintained in a deactivated state for a predetermined amount of time after the tunnel configuration information is transmitted;

wherein:
- the WLAN cell configuration information includes WLAN mobility set information; and
- the tunnel configuration information includes tunnel entity configuration information for instructing a controller of the UE to start processing data transmitted or received through the tunnel between the UE and the eNB;

wherein:
- the controller is configured to set up an internet protocol security (IPsec) tunnel between the UE and the eNB through the WLAN radio resource based on the tunnel configuration information,
- the transmitter is configured to transmit data to the eNB using the E-UTRAN bearer while performing the WLAN association and setting the IPsec tunnel, and to start transmitting data to the eNB using the IPsec tunnel after setting the IPsec tunnel, and
- the receiver is configured to receive data from the eNB using the E-UTRAN bearer while performing the WLAN association and setting the IPsec tunnel, and to start receiving data from the eNB using the IPsec tunnel after setting the IPsec tunnel;
- wherein the IPsec tunnel is set in a layer higher or lower than a packet data convergence protocol (PDCP) layer;
- wherein the controller of the UE is configured to perform an IPsec header encapsulation or decapsulation for the data transmitted or received through the IPsec tunnel between the UE and the eNB,
- wherein the higher layer signaling further comprises tunnel bearer configuration information for configuring a radio bearer that uses the tunnel, and
- wherein the tunnel bearer configuration information includes the data radio bearer (DRB) identification information that indicates the radio bearer related to the tunnel and start using the indicated radio bearer to transmit and receive data.

6. The UE of claim 5, wherein the WLAN cell configuration information further includes WLAN identification information that indicates the selected WLAN cell based on a measurement report from the UE.

7. The method of claim 1, wherein the controller of the UE is configured to further perform at least one of an IPsec security association and a key exchanging.

8. The method of claim 1, wherein the controller of the UE is configured to peer with a controller of the eNB.

9. The method of claim 3, wherein the controller of the eNB is configured to further perform at least one of an IPsec security association and a key exchanging.

10. The method of claim 3, wherein the controller of the UE is configured to peer with a controller of the eNB.

11. The method of claim 1, wherein maintaining the IPsec tunnel in a deactivated state comprises maintaining a tunnel bearer of the WLAN cell in a deactivated state.

12. The method of claim 3, wherein maintaining the IPsec tunnel in a deactivated state comprises maintaining a tunnel bearer of the WLAN cell in a deactivated state.

* * * * *